United States Patent [19]
Takahashi et al.

[11] 3,856,740
[45] Dec. 24, 1974

[54] POLYSULFIDE RUBBER SEALANT COMPOSITION
[75] Inventors: Naoya Takahashi; Yoshiaki Aida, both of Yokohama; Isoo Shimizu, Kawasaki, all of Japan
[73] Assignee: Nippon Petrochemicals Co., Ltd., Tokyo, Japan
[22] Filed: Feb. 27, 1973
[21] Appl. No.: 336,376

[30] Foreign Application Priority Data
Mar. 7, 1972   Japan................................ 47-23464

[52] U.S. Cl..... 260/33.6 AQ, 260/79.1, 260/668 C, 260/670
[51] Int. Cl............................................. C08c 11/22
[58] Field of Search....... 260/668 C, 33.6 AQ, 79.1, 260/670

[56] References Cited
UNITED STATES PATENTS

| | | | |
|---|---|---|---|
| 2,870,227 | 1/1959 | Petropoulos.................... | 260/668 C |
| 3,040,110 | 6/1962 | Matsuda et al. ................ | 260/668 C |
| 3,331,782 | 7/1967 | Deltieure........................... | 260/79.1 |
| 3,582,515 | 6/1971 | Volgstadt.................... | 260/33.6 AQ |
| 3,654,241 | 4/1972 | Doughty et al. .................. | 260/79.1 |

FOREIGN PATENTS OR APPLICATIONS
585,073   1/1947   Great Britain ................. 260/668 C Primary Examiner—Morris Liebman
Assistant Examiner—H. H. Fletcher
Attorney, Agent, or Firm—Fisher, Christen & Sabol

[57] ABSTRACT

A sealant composition having superior characteristic features which comprises a liquid polysulfide rubber vulcanizable by a vulcanizing agent and a plasticizer comprising a compound or mixture of compounds having the following general structural formula(:)

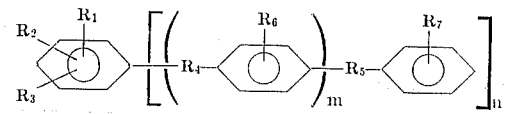

wherein $R_6$ and $R_7$ are H or $CH_3$, $n$ is 1 or 2, $m$ is 0 or 1 and $m + n$ is 1 or 2, and when $m + n$ is 1, $R_1$, $R_2$ and $R_3$ are each H or alkyl having from 1 to 4 carbon atoms and the total number of carbon atoms in said $R_1$, $R_2$ and $R_3$ is in the range of from 1 to 4, and $R_5$ is alkylene or polymethylene having from 1 to 3 carbon atoms, and when $m + n$ is 2, $R_1$, $R_2$ and $R_3$ are H or alkyl having from 1 to 3 carbon atoms and the total number of carbon atoms in said $R_1$, $R_2$ and $R_3$ is in the range of from 1 to 4, and $R_4$ and $R_5$ are alkylene or polymethylene having from 1 to 3 carbon atoms.

5 Claims, No Drawings

POLYSULFIDE RUBBER SEALANT COMPOSITION

This invention relates to a sealant composition made from a liquid polysulfide rubber, and more particularly to an excellent plasticizer having highly characteristic features which is used for producing sealants by making use of said liquid polysulfide rubber.

Such a sealant prepared from a liquid polysulfide rubber has a good adhesive property with substrates such as mortar, glass or aluminum and other metals, a high rubber-like elasticity at low temperatures, good oil-resistance and shock-resistance, etc. For these reasons, sealants made from liquid polysulfide rubber are widely used even under severe working conditions. In other words, such a sealant has a variety of uses such as a filling material of wall surfaces or window sashes for high rise buildings, for sealing of automobile window frames, or sealing the integration of fuel tanks of aircrafts.

There may be listed, for example, Thiokol LP-32 or Thiokol LP-2, etc., as a suitable liquid polysulfide rubber for making a sealant. Thiokol is an unvulcanized liquid rubber having an average molecular weight of 4,000, which is obtained of copolymerizing dichloroethyl formal ($ClCH_2CH_2OCH_2OCH_2CH_2Cl$) with sodium disulfide ($NaS_2Na$).

One method for producing sealants from the Thiokol or such liquid polysulfide rubbers is as follows:

To said liquid polymer are added, as reinforcing fillers, titanium oxide, zinc sulfide, silica pigment, calcium carbonate and carbon black, and plasticizer or a tackifier, thixotropic agent or a vulcanization retarder such as stearic acid or an activator or a stabilizer, and the mixed product is fully kneaded to obtain a basic material for the sealant. A metallic peroxides such as $PbO_2$, $MnO_2$, $ZnO_2$, or $CaO_2$ or an organic peroxide such as cumenehydroperoxide is generally used as a vulcanizing agent.

Lead peroxide may be kneaded with the basic material in the form of a powder, but usually in many cases it is kneaded in paste form by dispersing in a suitable diluent. Generally, a plasticizer is employed as the diluent in the field concerned. When $PbO_2$ is used as vulcanizing agent, it is preferable to use 7.5 parts by weight of lead peroxide per 100 parts by weight of unvulcanized liquid rubber.

The basic material for the sealant thus obtained is mixed and kneaded with the vulcanizing agent or paste immediately before its use, and the kneaded product is filled in or applied with a knife, spatula or spray gun to any place where sealing is desired and is vulcanized at room temperature to form the sealant.

There may often be required flexibility for some sealants. In these cases, a plasticizer is necessarily used. A desirable plasticizer for this purpose should be provided with the following properties:

1. High compatibility with liquid polysulfide rubber,
2. Large plasticizing efficiency,
3. Low volatility,
4. Good stability to heat and light,
5. Little blooming and migration from the sealant,
6. Good cold-resistance, good electrical characteristics and good chemical-resistance,
7. Non-poisonous to living body.

Heretofore, polychlorobiphenyl has been used as a plasticizer for a polysulfide rubber sealant. Polychlorobiphenyl is an excellent plasticizer, but is very toxic to living bodies and is not subject to biological degradation. Accordingly, polychlorobiphenyl once taken into the body can be excreted no longer, and remains therein. Thus, if polychlorobiphenyl were ingested for a long time even if in a very small dose, the polychlorobiphenyl stored in the body during the period would be large, and the influence to the living body would be unpredictably fatal. From the above reason, it is well known that as an alternative, the use of phthalic esters or phosphoric esters or chlorinated paraffins as plasticizers for a sealant has been proposed. These plasticizers described above, however, have disadvantages and are not satisfactory, as compared with the known polychlorobiphenyl. In fact, phthalic ester has a tendency to dissipate by vaporizing during use over a long period of time, and as a result, the flexibility or low temperature characteristics of the sealant are reduced. There also, occurs a severe defect in the strength of the sealant together with its thinning. A plasticizer made from phosphoric esters is of low cold-resistance and of low plasticizing efficiency, and further is neither stable to light nor heat. Chlorinated paraffins have poor heat stability, and dehydrochlorinate on heating which decreases performance as a sealant.

To describe this invention more in detail, this invention is intended to provide a polysulfide rubber sealant composition containing a plasticizer which overcomes the above-mentioned disadvantages and toxicity of polychlorbiphenyl, has high compatibility with said liquid polysulfide rubber, less volatility and good plasticizing efficiency.

According to this invention, a plasticizer which is used in said composition together with a liquid polysulfide rubber and various ingredients comprises a compound represented by the following general formula (I) or a mixture thereof:

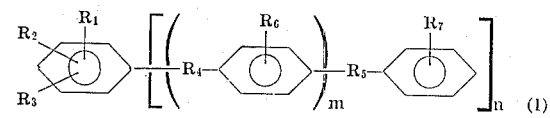
(1)

wherein $R_6$ and $R_7$ are H or $CH_3$ $n$ is 1 or 2, $m$ is 0 or 1 and $m + n$ is 1 or 2, and when $m + n$ is 1, $R_1$, $R_2$ and $R_3$ are each H or alkyl having from 1 to 4 carbon atoms and the total number of carbon atoms in said $R_1$, $R_2$ and $R_3$ is in the range of from 1 to 4, and $R_5$ is alkylene or polymethylene having from 1 to 3 carbon atoms, and when $m + n$ is 2, $R_1$, $R_2$ and $R_3$ are H or alkyl having from 1 to 3 carbon atoms and the total number of carbon atoms in said $R_1$, $R_2$ and $R_3$ is in the range of from 1 to 4, and $R_4$ and $R_5$ are alkylene or polymethylene having from 1 to 3 carbon atoms.

The compounds represented by the formula (I) are stable, high boiling and non-volatile, and compatibility with liquid polysulfide rubber is excellent.

Of the compounds according to formula (I) above, compounds having the following formulas are in particular desirable:

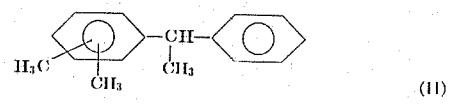
(II)

wherein $m + n$ is 1($m = 0$, $n = 1$), $R_1$ is H, $R_2$ and $R_3$ are $CH_3-$, $R_5$ is

and $R_7$ is H.

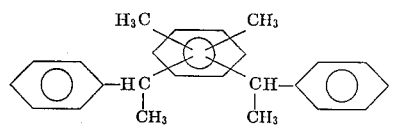

(III)

wherein $m + n$ is 2($m = 0$, $n = 2$), $R_1$ is H, $R_2$ and $R_3$ are $CH_3-$, $R_5$ is

and $R_7$ is H.

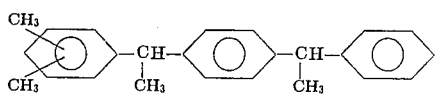

(IV)

wherein $m + n$ is 2($m = 1$, $n = 1$), $R_1$ is H, $R_2$ and $R_3$ are $CH_3-$, $R_4$ and $R_5$ are

and $R_6$ and $R_7$ are H.

The compounds of formulas (II), (III) and (IV) may be used alone or as a mixture thereof.

The compound of general formula (I) which is available for use a plasticizer for the composition according to this invention may be produced by any known methods. For example, it can be made by condensation reaction or benzene and an alkylbenzene with formaldehyde, acetaldehyde or propionaldehyde or by benzylation reaction of a polyalkylbenzene with benzyl chloride or by styrenation reaction of a polyalkylbenzene such as toluene, xylenes, ethylbenzene and a $C_9 - C_{10}$ aromatic hydrocarbon fraction with styrene or vinyltoluene or α-methyl styrene. Above all, the compounds of (II), (III) and (IV) may conveniently made by styrenation reaction of a $C_8$-aromatic compound or a mixture thereof using sulfuric acid as a catalyst.

The amount of plasticizer used for said polysulfide rubber sealant according to this invention is widely varied in accordance with the location of application, the purpose of use and the condition of exercise, and the quantity may be in the range of 10 – 40 parts by weight of plasticizer to 100 parts by weight of unvulcanized liquid polysulfide rubber. When it is too much, it undesirably causes the sealant to decrease in tensile or tear strength and adhesive property.

The preferred embodiment of this invention and superior properties of the plasticizer according to this invention will be described by way of the following examples, but it should be understood that these examples do not limit this invention so far as they are within the scope and spirit of this invention.

EXAMPLE 1

Preparation methods of plasticizers

A $C_8$-aromatic hydrocarbon fraction (a mixture of o- (33%), m- (37%) and p-xylene ) anp-xlene (20%) and ethylbenzene (10%) was styrenated at a temperature of 5°C in the presence of 95% sulfuric acid as a catalyst to obtain a mono-styrenated fraction and a di-styrenated fraction. The mono-styrenated fraction thus made had a distillation range of from 291° to 303°C and it mainly consisted of the compound having the following formula:

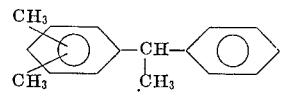

and was a fluid, colorless, and transparent liquid with a color +30 (Saybold Color Standard). The fraction was designated as product (1) according to this invention.

The di-styrenated fraction from said $C_8$-aromatics had a distillation range of from 369° to 392°C which comprised mainly the compound of the formula:

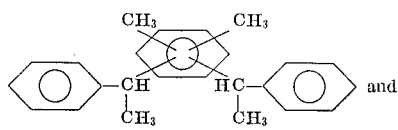 and

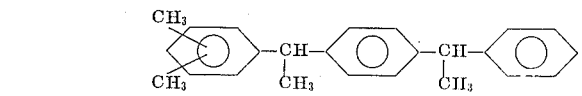

and was a semi-solid with white color at normal temperature. This was called product (2). The di-styrenated xylene fraction was further recrystallized from n-hexane and the crystalline part was filtered. The filtrate obtained thus was named product (3) according to this invention.

Then o-xylene was styrenated in the same manner as described above to make a mono-styrenated o-xylene fraction and a di-styrenated o-xylene fraction.

The mono-styrenated o-xylene fraction thus prepared had a distillation range of from 292° to 306°C, and was an almost colorless, fluid liquid of color +30 (Saybold Color Standard). The major part of the fraction had the following formula:

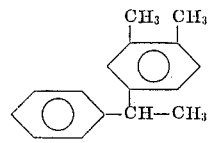

This was named product (4) according to this invention.

On the other hand, the di-styrenated o-xylene fraction mainly comprised the compound having the formulas:

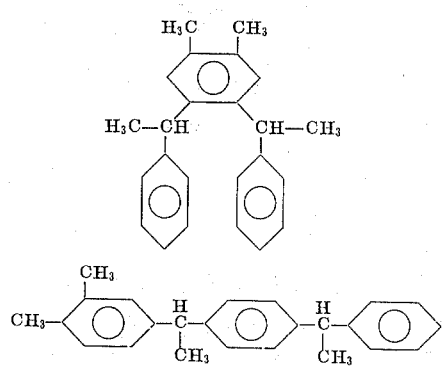

It's distillation range was from 357° to 391°C, and it was an almost colorless, transparent and viscous liquid with color +30 (Saybolt Color Standard), and was called product (5) according to this invention.

EXAMPLE 2

Preparation of sealant compositons and test results (1)

A variety of polysulfide rubber sealant materials were prepared in the manner described hereinbefore admixing a liquid polysulfide rubber and the said products (1) – (5) with other addition compounds in prescribed amounts, and the properties of said sealant materials were tested. The results are summerized in Tables I and II. Polychlorobiphenyl, tricresylphosphate (TCP) and butyl benzylphthalate (BBP) which are known plasticizers were used as comparative examples.

Table I

| Compounding Substance | Compounding Recipe (Parts by Weight) Experiment No. | | | | | | | Comparative Example | | |
|---|---|---|---|---|---|---|---|---|---|---|
| | 1 | 2 | 3 | 4 | 5 | 6 | 7 | C-1 | C-2 | C-3 |
| BASIC MATERIAL: | | | | | | | | | | |
| Liquid Polysulfide Rubber[1] | 100 | | | | | | | 100 | | |
| Tackifier[2] | 5 | | Common to from | | | | | 5 | Common to from | |
| TiO$_2$ | 10 | | Expiriments | | | | | 10 | Experi- | |
| Activated Ca Carbonate | 55 | | No. 1 through | | | | | 55 | ments No. C-1 | |
| Stearic Acid | 0.7 | | No. 7 | | | | | 0.7 | through | |
| Sulfur | 0.1 | | | | | | | 0.1 | No. C-3 | |
| Thixotropic Agent[3] | 2 | | | | | | | 2 | | |
| Product | | | | | | | | | | |
| (1) | 15 | | | | | | | | | |
| (2) | | 20 | 35 | | | | | | | |
| (3) | | | | 20 | | | | | | |
| (4) | | | | | 15 | | | | | |
| (5) | | | | | | 20 | 35 | | | |
| Pentachlorobiphenyl | | | | | | | | 35 | | |
| TCP | | | | | | | | | 35 | |
| BBP | | | | | | | | | | 35 |
| Vulcanizing Agent (Curing agent) | | | | | | | | | | |
| PbO$_2$ | 7.5 | | Common to from | | | | | 7.5 | Common to from | |
| Diluent (same as Plasticizer) | 7.5 | | Experiments No. 1 through No. 7 | | | | | 7.5 | Experiments No. C-1 through No. C-3 | |

Note
[1] Thiokol LP-32 (Trade Name, of Thiokol Chemical Corp.'s Make)
[2] Phenolic Resin (Trade Name, Methylon 75108)
[3] Thixatrol ST (Trade Name, of Baker Castor Oil Co.)

Table II

Test Results of Compositions obtained in Experiments of Table I

| Test Item | Experiment No. | | | | | | | Comparative Example | | |
|---|---|---|---|---|---|---|---|---|---|---|
| | 1 | 2 | 3 | 4 | 5 | 6 | 7 | C-1 | C-2 | C-3 |
| Slump[4] (mm) | <0.5 | <0.5 | — | <0.5 | <0.5 | <0.5 | — | <0.5 | <0.5 | <0.5 |
| Hardness[5] (HS) | | | | | | | | | | |
| Before Heating | 34 | 37 | — | 31 | 33 | 27 | — | 28 | 24 | 22 |
| After Heating of 70°C x 96 hrs. | 44 | 36 | — | 37 | 43 | 33 | — | 37 | 26 | 23 |
| Tensile Adhesion[6] (Glass, Initial State) | | | | | | | | | | |
| 150% modulus (Kg/cm$^2$) | 2.5 | 2.7 | — | 2.0 | 2.7 | 2.4 | — | 2.6 | 2.0 | 1.9 |

Table II—Continued

Test Results of Compositions obtained in Experiments of Table I

| Test Item | Experiment No. 1 | 2 | 3 | 4 | 5 | 6 | 7 | Comparative Example C-1 | C-2 | C-3 |
|---|---|---|---|---|---|---|---|---|---|---|
| T.B. (Kg/cm²) | 3.3 | 3.1 | — | 2.6 | 3.5 | 3.0 | — | 3.3 | 3.3 | 3.2 |
| E.B. (%) | 500 | 430 | — | 430 | 470 | 520 | — | 462 | 530 | 510 |
| Adhesion-in-Peel[7] (Glass, Kg/3cm) | 12 | 16 | — | — | 14 | 19 | — | 16 | 15 | 16 |
| Heating Loss* (%) Curing at 20°C, 55% R.H. for 7 Days + 7 Day Heating at 100°C | 14.3 | 4.7 | 6.9 | 6.5 | 13.9 | 3.5 | 5.2 | 11.5 | 5.3 | 5.2 |
| Pot life (min.)[8] | — | — | — | 28 | — | 32 | 47 | 17 | 21 | 23 |

*: Passing, if the loss is below 15%.
Test items 4 – 8 were conducted in accordance with JIS A-5754.

As is clear from the Tables, the sealant compositon according to this invention is the same as or superior to the compositions containing polychlorobiphenyl or TCP or BBP as plasticizer in all respects with regard to sealant properties. For example, the heating loss of the sealant containing the products (2), (3) or (5) which is an important test item in judging their performances for practical uses, is very small. They have a long pot life (a usable period of time) and good workability which are important properties in practice.

In this Example, only the compositions containing compounds having the structural formulas (II), (III) and (IV) among those of the formula (I) were tested and the results shown, but it was proved also that compositions containing other compounds of formula (I) had the same good performances as those of the compositions containing compounds (II), (III) and (IV). The compounds belonging to this series have a tendency to increase heating loss when they are of lower molecular weight, and so it is preferable to adjust the amount of the lower molecular compounds used so as to be rather less than that of the higher molecular compounds.

Further, a toxic and accumulative substance such as polychlorobiphenyl is not employed in the composition according to this invention. Accordingly it can be used in safety in such side fields of human activities as building construction and transportation.

EXAMPLE 3

Preparation of sealant composition and test results (2)

Weathering tests were conducted on a sealant compositon of this invention which contained the product (5) as a plasticizer A test piece was prepared according to the peel test specified in JIS A–5754. Adhesion-in-peel was tested at an initial state (14 days cure) and after exposure in a wheather-o-meter for 300 hrs. The composition of the sealant was the same as that manufactured by experiment No. 6 of Example 2, and weather-o-meter used was of Toyo Rika and the type was WE-SUN (C-arc type). Spraying time was 10 min/60 min. Adhesion-in-peel at the initial state was 20 Kg/3 cm and after exposure it was 18 Kg/3 cm. There was little decrease of adhesion properties.

What is claimed is:

1. A polysulfide rubber compositon vulcanizable by a vulcanizing agent to produce a sealant which comprises a liquid polysulfide rubber and a plasticizing amount of a plasticizer comprising a compound or mixture of compounds represented by the following structural formula:

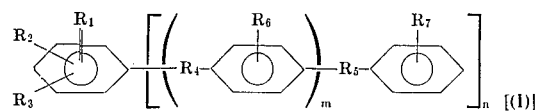

wherein $R_6$ and $R_7$ are H or $CH_3$, $n$ is 1 or 2, $m$ is 0 or 1 and $m + n$ is 2, $R_1$, $R_2$ and $R_3$ are H or alkyl having from 1 to 3 carbon atoms and the total number of carbon atoms in said $R_1$, $R_2$ and $R_3$ is in the range of from 1 to 4, and $R_4$ and $R_5$ are alkylene or polymethylene having from 1 to 3 carbon atoms.

2. A polysulfide rubber composition according to claim 1 in which said plasticizer comprises a compound or mixture of compounds having one of the following formulas:

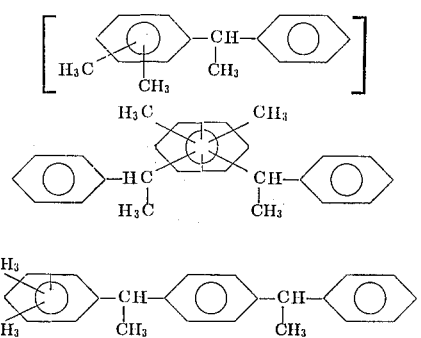

3. A polysulfide rubber composition according to claim 1 which comprises 10 – 40 parts by weight of said plasticizer and 100 parts of liquid polysulfide rubber.

4. A polysulfide rubber composition according to claim 1 containing also a member selected from the group consisting of a filler, a takifier, a thixotropic agent, a vulcanization retarder, a vulcanizing agent, a stabilizer and mixtures thereof.

5. A polysulfide rubber composition according to claim 2 containing also a member selected from the group consisting of a filler, a tackifier, a thixotropic agent, a vulcanization retarder, a vulcanizing agent, a stabilizer and mixtures thereof.

* * * * *